(No Model.)
R. HAMILTON.
HARVESTER TRUCK.
No. 292,219. Patented Jan. 22, 1884.
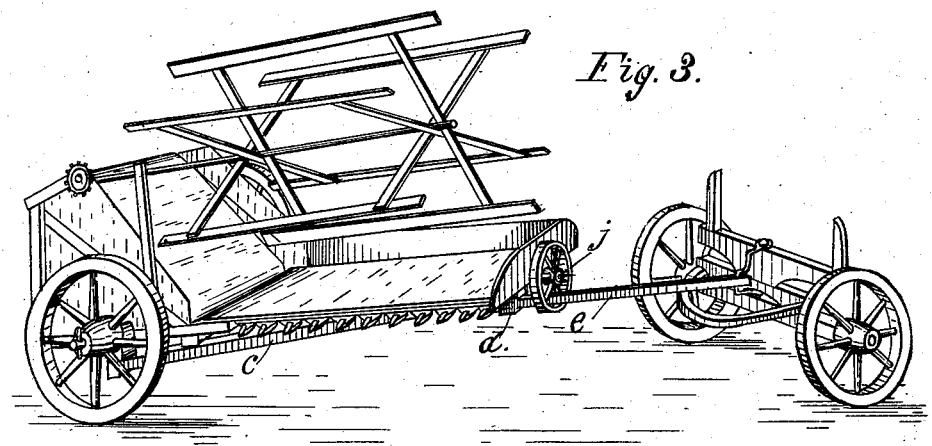
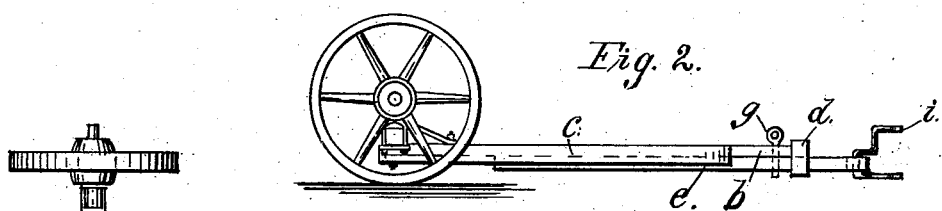
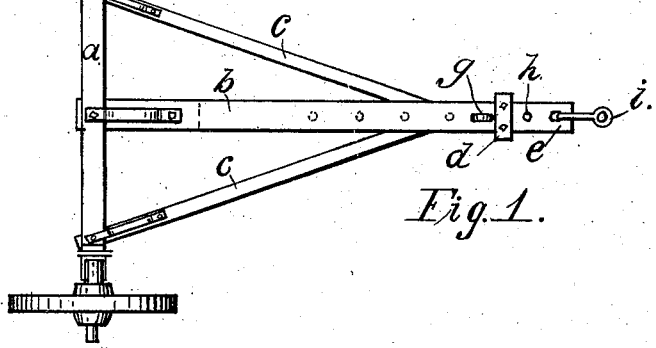
WITNESSES: Frank A. Jacob. E. A. Abbott
INVENTOR: Robert Hamilton By H. P. Hood Atty.

UNITED STATES PATENT OFFICE.

ROBERT HAMILTON, OF FRANKLIN, INDIANA.

HARVESTER-TRUCK.

SPECIFICATION forming part of Letters Patent No. 292,219, dated January 22, 1884.

Application filed November 26, 1883. (No model.)

*To all whom it may concern:*

Be it known that I, ROBERT HAMILTON, a citizen of the United States, residing at Franklin, in the county of Johnson and State of Indiana, have invented a new and useful Improvement in Trucks, of which the following is a specification.

My invention relates to that class of trucks which are used for moving harvesting-machines from place to place.

The objects of my improvements are to facilitate the loading of the harvester onto the truck and to hold the harvester in place when loaded. In a grain-harvester truck it is important to have such a construction that the harvester may be loaded onto the truck easily, and on account of the concentration of weight in and about the driving and carrying wheel of the harvester, and the comparative lightness of the cutters and grain-board, it is necessary in that class of trucks to which my present invention belongs to provide some means to overcome the tendency of the harvester when loaded on the truck to tip backward. The above-mentioned results I attain by the construction illustrated in the accompanying drawings, in which—

Figure 1 is a plan. Fig. 2 is a side elevation. Fig. 3 is a perspective showing the truck and the harvester in position thereon.

$a$ is an axle, preferably bent downward or offset, so as to permit the use thereon of the hind wheels of an ordinary farm-wagon. $b$ is a center-pole, having one end secured to the center of axle $a$, and the other end secured between and braced by the hounds $c\ c$, said hounds, axle, and center-pole being rigidly secured together. To the outer end of the center-pole $b$ is secured a stirrup, $d$, which is for the purpose of sustaining and guiding a draft-pole, $e$. Said draft-pole is arranged to slide in stirrup $d$ and underneath center-pole $b$, and is also further guided by the ends of hounds $c\ c$, which project below the under side of pole $b$, as shown. Pole $e$ is adjustably secured in relation to pole $b$ by a pin, $g$, which passes through $b$ and either one of a series of holes, $h$, in pole $e$. The outer end of pole $e$ is mortised, to receive a clevis, $i$, which is for the purpose of connecting the truck with the fore axle of a farm-wagon, and which is the subject of another application for Letters Patent.

The length of center-pole $b$ and draft-pole $e$ is such that when pole $e$ is pushed under $b$ as far as possible the entire length of the truck from the back of the axle to the end of the draft-pole is a little less than the distance between the carrying-wheel and the grain-wheel of the harvester.

The operation of loading my truck is as follows: The carrying-wheel of the harvester resting on the ground, the opposite end of the machine is raised and the truck is then backed under the harvester, the front end of the truck being raised at the same time to allow the axle to go back as near as possible to the carrying-wheel of the harvester. The harvester and the forward end of the truck are now lowered, and the carrying-wheel of the harvester is thereby raised clear of the ground. As the harvester comes down, the grain-wheel $j$ falls in front of the draft-pole $e$, which is then drawn forward between the spokes of the grain-wheel, and is coupled by means of the clevis to the forward axle and wheels of a farm-wagon, or to an axle and wheels made expressly for this purpose, as may be desired. Said draft-pole having been drawn forward sufficiently far to allow the forward wheels to clear the grain-wheel in turning the truck, it is secured in position by pin $g$. The harvester is thus, by means of the draft-pole of the truck passing through the grain-wheel held securely against tipping backward or shifting sidewise.

I claim as my invention—

1. A truck consisting of an axle, a pair of wheels on said axle, center-pole $b$, hounds $c\ c$, draft-pole $e$, and means for adjustably securing said draft-pole to said center-pole, all combined substantially as and for the purpose set forth.

2. In a harvester-truck, the combination, with a harvester, of a truck consisting of an axle, a pair of wheels on said axle, and an adjustable sliding draft-pole secured to said axle and adapted to pass through the grain-wheel of said harvester, for the purpose specified.

ROBERT HAMILTON.

Witnesses:
H. P. HOOD,
FRANK. A. JACOB.